Figure 1:
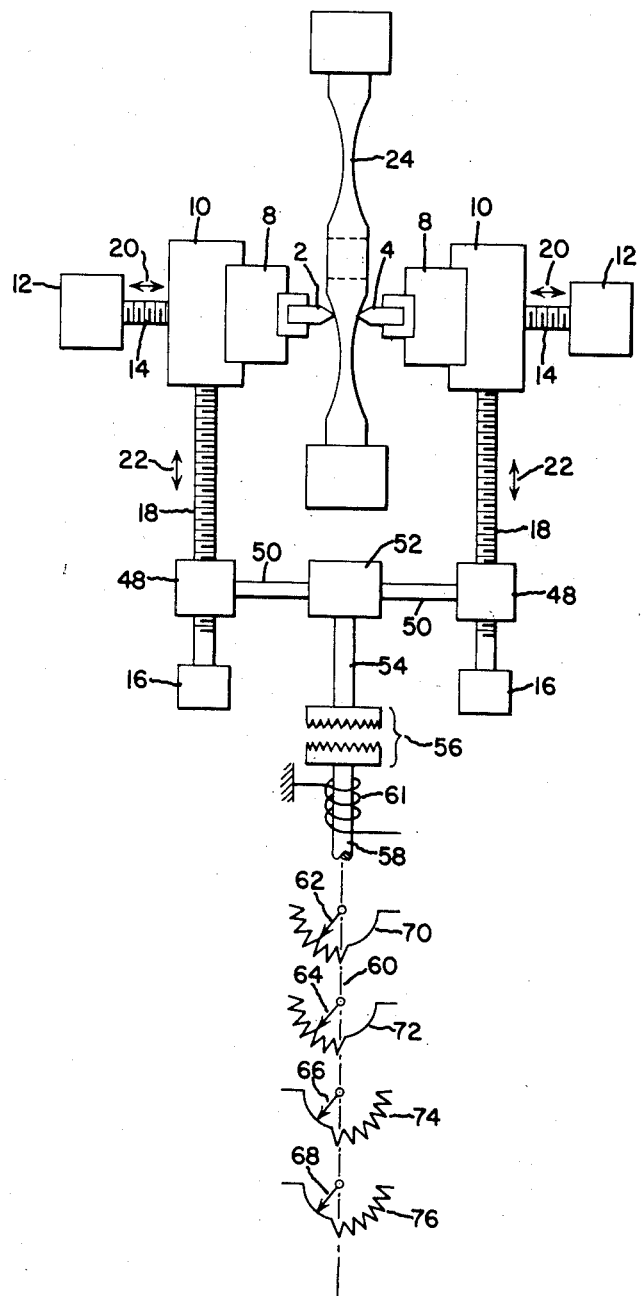

United States Patent Office 2,887,639
Patented May 19, 1959

2,887,639

TRACER SYNCHRONIZING SCHEME FOR CENTER DRIVE LATHES

John L. Dutcher, Schenectady, N.Y., assignor to General Electric Company, a corporation of New York Application January 29, 1957, Serial No. 636,895

2 Claims. (Cl. 318—39)

This invention relates to improvements in electric control systems, more particularly, to improvement in tracer control systems for machine tools wherein a template or pattern is traced by a stylus to control the motion of the tool.

In many applications of tracer control systems, two stylii are utilized to follow a template or two templates in order to control the motions of two cutting tools on a machine tool shaping a workpiece. It has been found desirable in these instances to synchronize the motions of the two styli, i.e., to maintain them and/or the cutting tool in a predetermined positional relationship as the work proceeds. One such application is the fabrication of rotor wheels for gas turbine engines. The tendency of the design of these wheels is toward thin webs and the most practical way to machine these wheels is in a center drive lathe with two tools simultaneously working on opposite sides of the wheel. This will tend to balance the tool forces on the two sides and result in a greater accuracy since the wheel will be completely turned in a single setup. It has been found that such a machine may be made automatic and simple to operate by the use of a tracer control system utilizing two styli engaging separate templates, each template representing one side of the rotor wheel. In such an application of automatic machine tools, it is necessary to provide equipment to keep the two tools opposite as machining progresses. This will tend to minimize stresses created by an unbalance of forces on either side of the work.

Therefore, it is an object of this invention to provide an improved tracer control system for use in controlling separate cutting tools in a machine tool in such a way that the cutting tools are maintained in a predetermined positional relationship with each other as the work progresses.

It is another object of this invention to provide an improved tracer control system wherein means are provided to maintain tools on opposite sides of the workpiece in a center drive lathe opposite to each other within close tolerances by varying the feed speed of the tracers on the face of templates whose shape is being duplicated by the machine tool.

In carrying the invention into effect in one form thereof a means responsive to or detecting the displacement of a pair of cutting tools in a machine tool from a predetermined positional relationship is provided. Control elements actuated by this means act to vary the relative speeds of styli forming a part of a tracer control system until the predetermined positional relationship is re-established.

Figure 2:
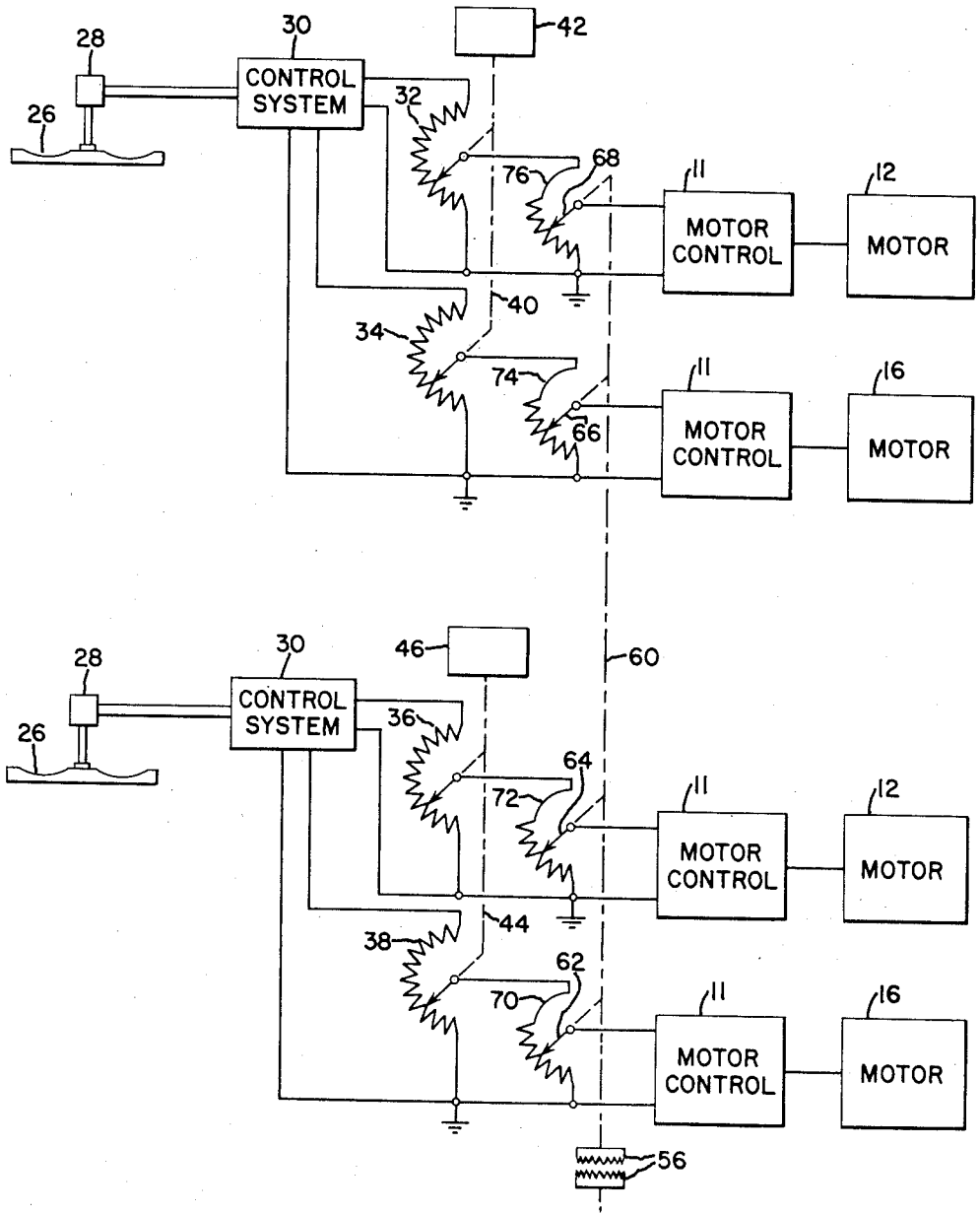

The subject matter which I regard as my invention is particularly pointed ont and distinctly claimed in the concluding portion of this specification. My invention, however, both as to its organization and method of operation, together with further objects and advantages thereof, may best be understood by reference to the following description taken in connection with the accompanying drawing in which:

Fig. 1 is a diagrammatical illustration of a machine tool incorporating my invention; and Fig. 2 is a schematic illustration of my invention incorporated in a tracer control system.

Tracer control systems when applied to machine tools may take several forms such as electrical, hydraulic, mechanical, i.e., pantographs or any combination of these. A common connection of tracer control systems is to mount the stylus which engages the template on a support which is rigidly connected to the head of the tool so that a feed motor drives both the stylus and the head supporting the cutting tool. Such an arrangement is shown in the patent to Branson 2,492,731 issued December 27, 1949 and assigned to the same assignee as this application.

Referring to Fig. 1, I show in a diagrammatical manner portions of a machine tool such as a center drive lathe. The machine tool comprises a pair of cutting tools 2 and 4. The cutting tools are mounted on suitable tool posts which in turn are supported on a crossfeed support 8 which is slidable in suitable guidways (not shown). Longitudinal feed is provided by means of the movable supports 10 mounted in longitudinal guideways (not shown). Motors 12 actuate drive screws 14 to move the longitudinal feed supports 10 as desired. Crossfeed feed motors 16 drive transverse feed screws 18 which are connected to the crossfeed supports 8. In this manner, longitudinal feed is accomplished in the directions shown by the arrows 20 and crossfeed is accomplished in the directions shown by the arrows 22. A workpiece 24 is mounted on a suitable means (not shown) and in the illustration, it may take the form of the rotor wheel of a jet engine. Such rotor wheels may not be symmetrical, one side to the other, and means for synchronizing tool position in the crossfeed direction, in such situations will be described in greater detail hereinafter.

In order to automatically control the machine tool producing such workpieces, a tracer control system such as shown in the Branson patent supra may be used, and in Fig. 2 of the drawing, the application of such a tracer control system is illustrated. Templates 26 are provided for each side of the workpiece. A tracing head 28, which is mounted on the machine tool and, as is described in the patent to Branson, moves in conjunction with the cutting head thereof, is provided to contact each template. The outputs of each tracing head are connected to a control system 30 and are supplied to the motors 12 and 16 to position the cutting tools 2 and 4 in accordance with the information stored in the template. Since the control signals furnished to the motors 12 and 16 contain both speed and direction information, it is possible to derive any proportion of the speed information desired in order to hold a preset speed along the template surface. This may be accomplished by the provision of potentiometers 32, 34, 36 and 38 in the motor control circuits. In order to control the speed of the motors for one side of the center drive lathe, the potentiometers 32 and 34 may be ganged as shown by the dotted line 40 and positioned by the knob 42. Similarily, potentiometers 36 and 38 may be ganged as shown by the dotted line 44 and set to a predetermined position by the knob 46.

Referring again to Fig. 1, in order to synchronize the movements of the cutting tools 2 and 4, the crossfeed motors 16 drive the feed screws 18 through a gear transmission such as shown diagrammatically at 48. Shafts 50 extend from the gear transmission 48 to drive a differential gear mechanism 52. The output of the differential gear mechanism 52 is a shaft 54 which is coupled by means of a clutch 56 to the shaft 58. The rotary position of shaft 54 then represents the relative position of the two tool posts 6 in the crossfeed direction.

Mechanically connected to the shaft 58 as shown by the dotted line 60 are the wipers 62, 64, 66 and 68 of the potentiometers 70, 72, 74 and 76. These potentiometers are electrically connected so that their rotation modifies the speed input signal to the motor feed drives 12 and 16 as shown in Fig. 2. A spring such as shown at 61 mounted on a suitable support 62 engages the shaft 58 to maintain it in the center position when the clutch 56 is disengaged. It is to be noted that the right-hand sides of the potentiometers 70 and 72 are blank elements, whereas the left-hand sides are constituted by resistance elements and vice versa the left-hand sides of the potentiometers 74 and 76 are blank elements, whereas the right-hand sides are constituted by resistance elements. If desired, a small overlap may be provided for the resistance elements in the potentiometers. This is done in order to insure that there is no dead zone at the center point, and secondly it gives increased sensitivity on thin webs wherein the two templates are reasonably symmetrical. Alternatively, the resistance elements may be shifted slightly to provide a deadband if backlash hunting is a problem. Also, limit switches not shown may be provided to be actuated by the shaft 54 or 58 when either has turned a predetermined amount from center in either direction to open or close the other tracer speed control circuits so as to stop one tracer completely when a maximum departure from the predetermined positional relationship has been reached.

In the general operation of this device, it may be seen that when one cutting tool 2 or 4 runs ahead or behind the other, this will be represented by a faster or slower rotation of one of the shafts 18. This being the case, the shafts 50 will not rotate equally and there will be an output of the differential mechanism 52 which will be transmitted by the shaft 54 and through the clutching mechanism 56 to the shaft 58. Consequently, the wipers 62, 64, 66 and 68 will be shifted in either direction depending on the sense of the error or departure from the predetermined positional relationship. This will have the effect of inserting more or less resistance in series with the motor controls thereby slowing down one or the other of the motors 16 and its companion motor 12 and the cutting tools 2 and 4 will then tend to reassume the predetermined positional relationship which in the illustrated embodiment is generally a position of being opposite each other. Thus, in the operation of the invention in the illustrated embodiment, the potentiometers 62, 64, 66 and 68 will first be centered. The cutting tools 2 and 4 will be brought into position correspondence and with manual speed controls, potentiometers 32, 34, 36 and 38 set exactly equal the clutch 56 is closed. If the two templates are symmetrical, the tools 2 and 4 will tend to stay in correspondence. However, if for some reason one tool tends to get slightly ahead of the other, the shaft 54 will turn slightly moving the potentiometers 62, 64, 66 and 68 and reducing the speed of one tracer by a small amount and increasing the speed of the other slightly. This will tend to bring the tools back opposite each other and center the potentiometer again.

Where the templates are not symmetrical, one tracer will continue to run somewhat slower than the other. Therefore, the tools will continue to run out of correspondence by a very small amount until the templates again become symmetrical.

While I have shown a particular embodiment of my invention, it will, of course, be understood that I do not wish to be limited thereto since many modifications both in the circuit arrangement and in the instrumentalities employed may be made and I, therefore, contemplate by the appended claims to cover any such modifications as fall within the true spirit and scope of my invention.

What I claim as new and desire to secure by Letters Patent of the United States is:

1. A motion control system comprising a pair of templates, a pair of tracer devices, a separate control signal means responsive to the movement of each tracer device, a motor means controlled by each control signal means, a pair of work engaging tools, rotatable shafts coupling said motor means to said work engaging tools, a differential gear device having a pair of input shafts and an output shaft, said input shafts being driven by said rotatable shafts, said differential gear device developing an output when said rotatable shafts rotate by different amounts indicating said work engaging tools have departed from a predetermined positional relationship, potentiometer means interposed between said control signal means and said motor means, and means connecting said potentiometer means to said differential gear device to vary the relative speeds of said motor means.

2. A motion control system comprising a pair of templates, a pair of tracer devices, a separate control signal means responsive to the movement of each tracer device, a motor means controlled by each control signal means, a pair of work engaging tools, movable shafts coupling said motor means to said work engaging tools, a differential gear device having a pair of input shafts and an output shaft, said input shafts being driven by said movable shafts, said differential gear device developing an output when said movable shafts move by different amounts indicating said work engaging tools have departed from a predetermined positional relationship, speed control means interposed between said control signal means and said motor means, and means connecting said speed control means to said differential gear device to vary the relative speeds of said motor means.

References Cited in the file of this patent

UNITED STATES PATENTS

| | | |
|---|---|---|
| 2,295,397 | Geisehman | Sept. 8, 1942 |
| 2,397,108 | Hanna et al. | Mar. 26, 1946 |
| 2,445,439 | King | July 30, 1948 |
| 2,630,038 | Buell et al. | Mar. 3, 1953 |